J. C. DAWSON.
CABLE GRIP.
APPLICATION FILED MAY 11, 1908.
926,926.
Patented July 6, 1909.
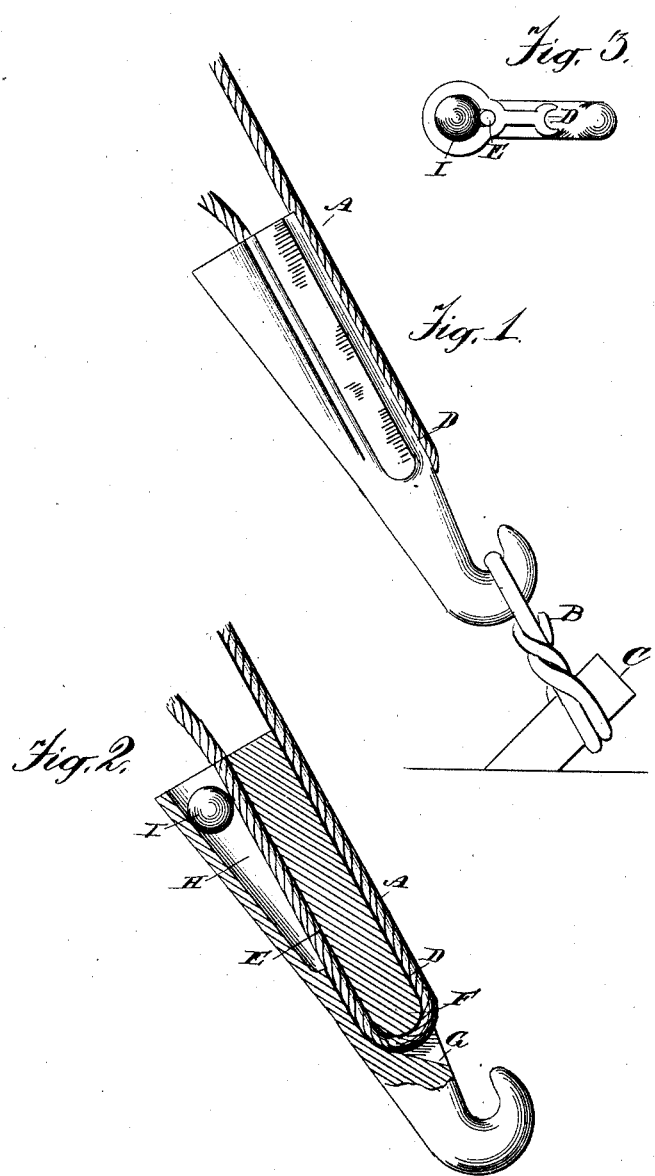

UNITED STATES PATENT OFFICE.

JOHN C. DAWSON, OF RICHMOND, INDIANA.

CABLE-GRIP.

No. 926,926.　　　Specification of Letters Patent.　　Patented July 6, 1909.

Application filed May 11, 1908. Serial No. 432,325.

*To all whom it may concern:*

Be it known that I, JOHN C. DAWSON, a citizen of the United States, residing at Richmond, in the county of Wayne and State of Indiana, have invented certain new and useful Improvements in Cable-Grips, and do hereby declare the following to be a full, clear, and exact description of the invention, such as will enable others skilled in the art to which it appertains to make and use the same.

This invention relates to guys and cables, and has for its object to provide a simple, powerful and quick-acting grip for the looped end of a cable, whereby it may be connected with a hook, or the like, in a convenient and serviceable manner.

The nature of the invention is fully disclosed in the description and claims following, reference being had to the accompanying drawing, in which—

Figure 1 is a side view of a device embodying my invention. Fig. 2 is a longitudinal section of the same. Fig. 3 is a view of the same as seen from the upper end.

In the drawing, A denotes a wire cable, which in this case is supposed to act as a guy, connecting by looped and twisted wire or the like, B, with a stake C. The connecting medium is shown as a hook. This is a casting (preferably malleable) having an external groove at D to admit the cable, and a similar internal groove at E. These grooves unite around a rounded end-piece F, which takes the loop of the cable, as shown in Fig. 2. The passage to the internal groove is widened at G, so as readily to admit the end of the cable. Adjacent to the internal groove is a tapered chamber H. The internal groove is made a little shallower than the diameter of the cable, so that a part of the cable lies in this chamber. Looped as shown, the cable is securely fastened by a wedging device, preferably ball I, tapped lightly in place. It is evident that the greater the strain on the cable the tighter will it be gripped. On being slackened the cable is released in a moment by pulling up on the end projecting from the internal groove.

Having thus described my invention, I claim:

1. In a cable grip, the combination of a hook having a conical chamber therein, a passage communicating with said chamber, one wall of which is rounded, and a fastening ball in said chamber.

2. In a cable-grip, the combination of a hook, having an external groove adapted to receive the cable, an internal groove uniting therewith around a rounded terminus, a tapered chamber into which the internal groove opens, and a wedging device fitted in said chamber.

In testimony whereof I affix my signature in presence of two witnesses.

JOHN C. DAWSON

Witnesses:
　N. H. HUTTON,
　A. R. HUTTON.